United States Patent [19]
Mikaila

[11] 3,731,979
[45] May 8, 1973

[54] BRAKE ANTI-SKID SYSTEM

[75] Inventor: Joseph J. Mikaila, Southfield, Mich.

[73] Assignee: The United States of America as represented by the Secretary of the Army, Washington, D.C.

[22] Filed: Mar. 19, 1971

[21] Appl. No.: 125,985

Related U.S. Application Data

[63] Continuation-in-part of Ser. No. 873,428, Nov. 3, 1969, abandoned.

[52] U.S. Cl. ................................. 303/21 F, 303/61
[51] Int. Cl. ................................................ B60t 8/12
[58] Field of Search ....................... 303/21 F, 21 BE, 303/61–63, 68–69, 6, 10; 188/181

[56] References Cited

UNITED STATES PATENTS

| | | | |
|---|---|---|---|
| 2,959,012 | 11/1960 | Johnson | 303/61 X |
| 3,089,734 | 5/1963 | Jankus | 303/61 X |
| 3,361,487 | 1/1968 | Vriend | 303/61 |
| 3,404,923 | 10/1968 | Smoren | 303/61 |
| 3,536,363 | 10/1970 | Ravenec | 303/21 F |
| 3,558,197 | 1/1971 | Lueck et al. | 303/21 BE |

Primary Examiner—Duane A. Reger
Attorney—Edward Kelly, Harry M. Saragovitz, Herbert Berl and John F. Schmidt

[57] ABSTRACT

An electromagnetic sensing device on the wheels of a vehicle produces a voltage that is used to keep a relay switch in a central power circuit open. Upon loss of this voltage due to stoppage of a wheel during skidding, the power circuit closes a solenoid valve in the hydraulic brake line, preventing the brake fluid pressure from dropping, and thus keeping the brake disc from rotating. Simultaneously, a square wave generator in the power circuit produces a square wave voltage to activate a solenoid coil operating a piston for automatically cycling the pressure in the brake line, maintaining the brake torque at or near the point of critical slip.

14 Claims, 4 Drawing Figures

BRAKE ANTI-SKID SYSTEM

RELATED APPLICATIONS

This application is a continuation-in-part of my application Ser. No. 873,428, filed Nov. 3, 1969, now abandoned and relating to a Brake Anti-Skid System.

The invention described herein may be manufactured, used, and licensed by or for the Government for governmental purposes without payment to me of any royalty thereon.

BACKGROUND OF THE INVENTION

1. Field of the Invention

This invention relates to anti-skid brake systems and more particularly to an anti-skid brake system having a minimum response time.

2. Description of the Prior Art

Present anti-skid brake systems attempt to keep the vehicle wheels in a braking situation whereby the braking torque does not exceed a value corresponding to the point of "critical slip" between the wheels and the ground. "Critical slip" is the point where the frictional force between a wheel being braked and the surface engaging the wheel is at a maximum thus providing minimum stopping distance and maximum braking effectiveness with a minimum of tire wear and optimum control of the vehicle being braked.

The present anti-skid systems attempt to keep the vehicle wheels operating as close as possible to the critical slip point, which can be represented as a horizontal line plotted on a graph, the ordinate of which is time and the abscissa is brake line pressure measured in pounds per square inch. These prior art systems, as exemplified by U. S. Pat. No. 3,235,036 employ a rotational motion sensing device mounted on the vehicle wheel which emits either a mechanical or electrical signal whenever the wheel stops rotating and starts to skid. This signal is received by a control circuit which functions to lower the brake-line pressure until the circuit is signaled by the sensing device that the wheel has resumed turning. At this point in time the control circuit raises the brake line pressure until the wheel again stops turning whereupon the cycle is repeated until the vehicle is brought to a stop.

One disadvantage of the above mentioned prior art systems is that they are slow in response time while being high in initial cost and maintenance. The response time, or the time required for each cycle, is relatively long because of the numerous operations which have to be performed during each cycle. This longer response time is particularly true in a purely mechanical system while the use of quicker response times attained with all electronic systems have the disadvantage of greatly increased initial costs and maintenance.

SUMMARY OF THE INVENTION

The invention relates to a vehicle brake system wherein a rotating wheel sends a signal to a central power circuit. When the braked wheel locks up and stops sending the signal, the power circuit is closed to operate a valve in the hydraulic brake circuit, isolating the brake from the master cylinder so that fluid pressure in the brake cylinder may be pulsed below and above lock-up pressure, the pulsing being accomplished by a pump activated on closure of the central power circuit.

DESCRIPTION OF THE PREFERRED EMBODIMENT

Figure 1:
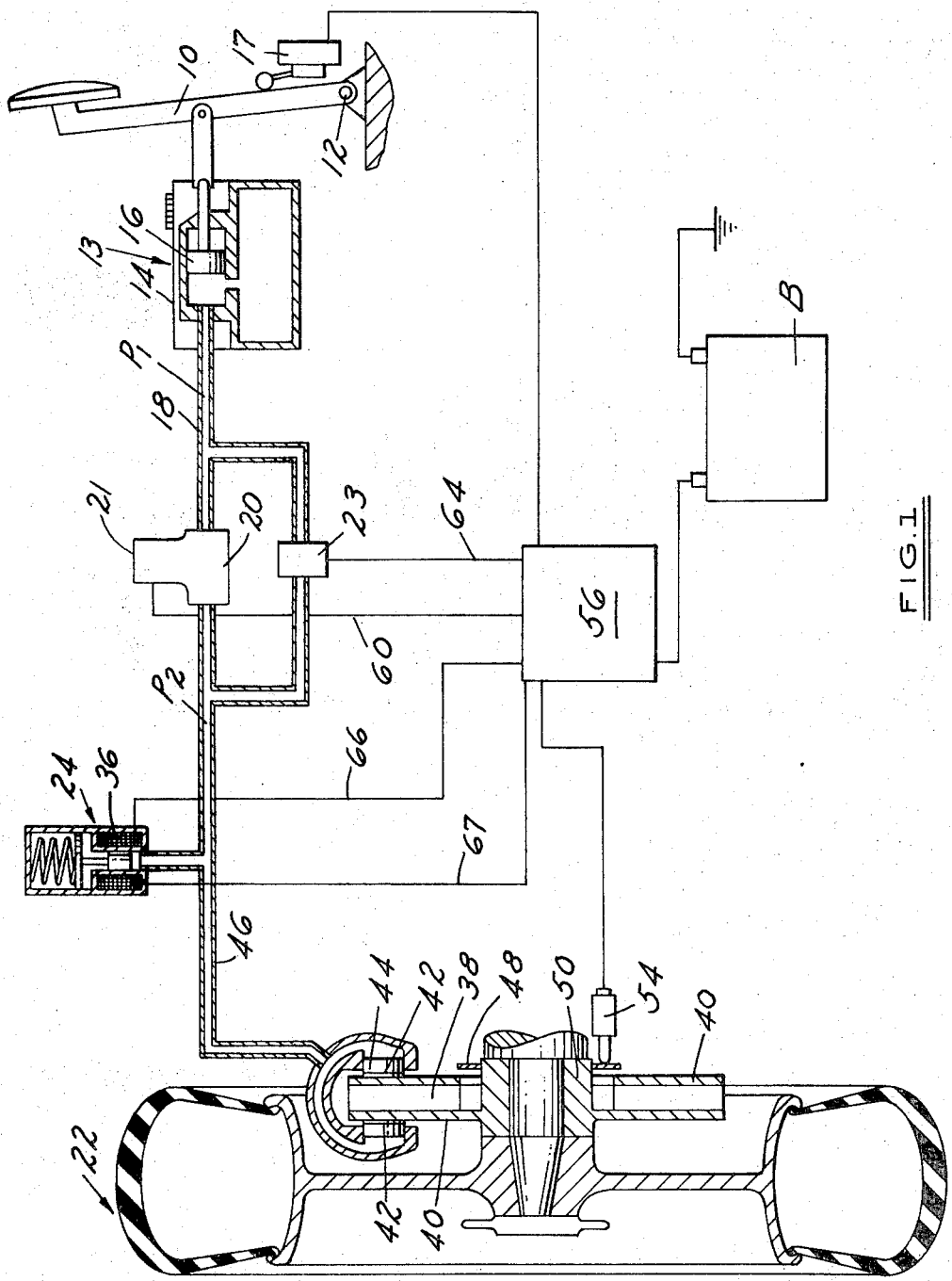
FIG. 1 is a schematic illustration of a brake control system representing one form of the invention.

Referring now to FIG. 1, an operator-operable actuator 10, here shown as a brake pedal, is pivotally supported from a fixed portion of a vehicle pivot 12 and is adapted to generate a pressure in a fluid pressure pump 13 here shown as a conventional hydraulic ram and usually referred to as a master brake cylinder. Pump 13 comprises a cylinder element 14 and a piston element 16 of which element 16 is connected to actuator 10. A normally closed switch 17 is disposed so as to be held open by pedal or actuator 10 when the parts are in the operating position shown in FIG. 1; switch 17 is allowed to close when actuator 10 is operated to engage the brake to effect a stop.

Master cylinder 13 is connected at its delivery port with a brake conduit 18 in which there is provided a normally-open valve 20. Valve 20 is spring-biased open and is held closed by a solenoid 21. Valve 20 is a standard, off-the-shelf item, so details need not be disclosed here. As will be understood by those skilled in the art, solenoid 21 is connected to be energized by the central power circuit. A vehicle wheel is shown at 22, and a pressure sensor 23 parallels valve 20 and is connected with brake conduit 18 on both sides of valve 20 so as to respond to pressure $P_1$ in the portion of brake conduit 18 between master cylinder 13 and valve 20, and to pressure $P_2$ in the portion of the brake conduit between valve 20 and the brake cylinder.

Figure 2:
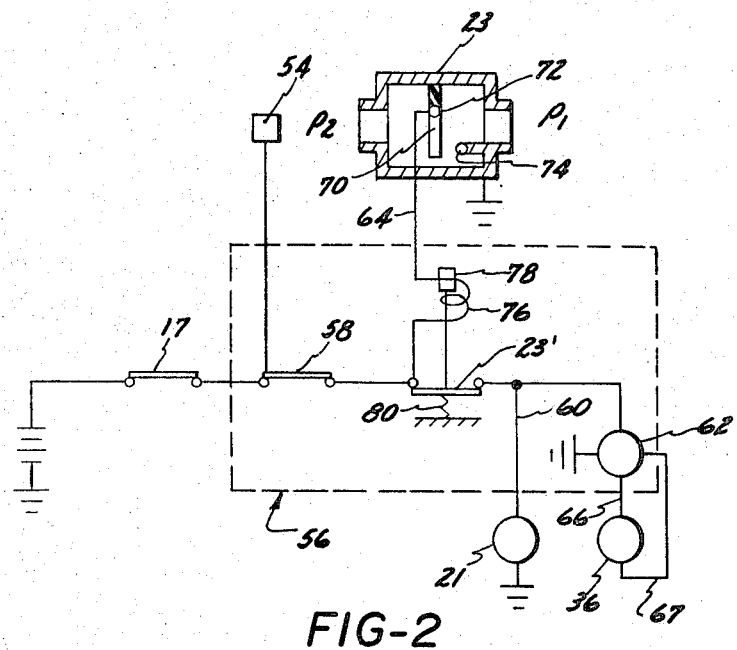
FIG. 2 is a schematic control diagram depicting principal components of a control system.

Sensor 23 is connected to actuate a normally-closed switch 23' in the central power circuit; see FIG. 2. Switch 23' is opened in response to a condition of greater pressure $P_2$ or, expressed mathematically, a condition in which $P_2 > P_1$.

Figure 3:
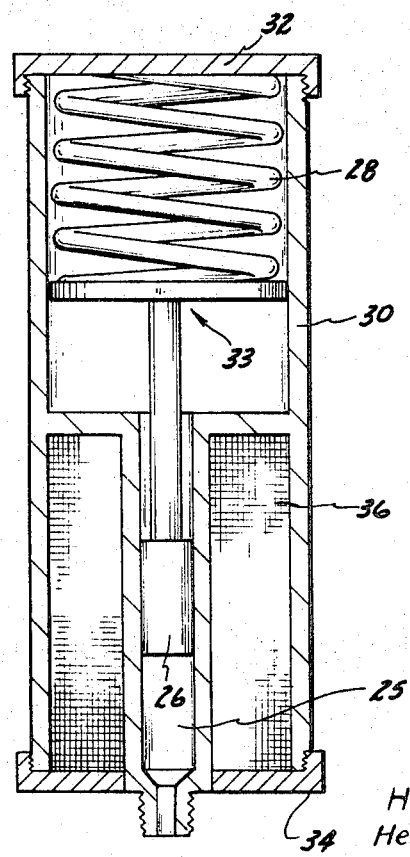
FIG. 3 is an enlarged sectional view of one component of the apparatus of FIG. 1.

A source 24 of fluid at a fluctuating pressure, hereinafter referred to as a pulse pump, is connected with the brake conduit between valve 20 and wheel 22. As is best seen in FIG. 3, a cylindrical chamber 25 is fitted with a piston 26 so that the piston is free to move vertically in response to fluid pressure in chamber 25. Resilient means 28 is disposed in the upper portion of cylindrical body 30 between end cap 32 and a spring seat structure 33 connected with piston 26, and biases piston 26 downward against the bias of the fluid in chamber 25.

At its lower end cylindrical body 30 is covered by a closure or end cap 34 and encloses a solenoid 36 which is an off-the-shelf coil adapted to be operated from a DC source of power, such as an automobile battery, as will be explained below. Pulse pump 24 is in effect a "fail-safe" device in that sticking of piston 26 or breakage of spring 28 merely requires that the operator fall back on conventional operation of the breaking system.

In the sectional view at the left of FIG. 1, a typical vehicle wheel 22 is illustrated having a brake disc structure 38 rotatable with the wheel and having surfaces 40 adapted to be engaged by suitable friction pad means 42. The friction pads are normally carried in juxtaposition to the disc surfaces 40 and are responsive to hydraulic pressure acting on hydraulic cylinders 44 to move the pads 42 into frictional engagement with the surfaces 40 to effect braking action.

Wheel 22 is provided with suitable sensing means such as a magnetic collar 48 having radial perforations or slots (not shown) of a type described in U. S. Pat. No. 3,450,444 issued June 17, 1969 to Robert L. Ballard. A magnetic pick-up device indicated at 54 is suitably mounted in fixed relation to the wheel such that movement of the collar relative to the device 54 will generate a D. C. voltage which is passed to the control center indicated by box 56. A relay switch 58 is located in control center 56 and is held open by the voltage generated by the magnetic sensing circuit of the rotating wheel.

OPERATION

In operation, when the pistons of hydraulic cylinders 44 apply suitable pressure to disc 38 through pads 42 so that disc 38 and wheel 22 stop rotating, the wheel is locked with the result that the voltage generated in the magnetic pick-up device 54 drops to zero, closing the relay switch 58. At this stage, differential pressure switch 23' is already closed because pressure $P_2$ does not exceed pressure $P_1$. The leads 60 and 64 connect solenoid 21 and switch 23' through the central control box 56. With switches 17, 23' and 58 closed, solenoid 21 is energized so that valve 20 is automatically closed, isolating the portion of the brake circuit between valve 20 and wheel 22 from the master cylinder.

It will of course be understood by those skilled in the art that, in the vast majority of cases, the operator or driver of the vehicle will be in a "panic stop" situation; he will be "standing on" the brake pedal, as the expression goes. As soon as a wheel stops turning, valve 20 closes and at that instant, $P_2 = P_1$. However, because of the panic conditions, the pressure in the brake conduit on the pedal side of valve 20 rises asymptotically to a value such that $P_1$ is many times more than $P_2$.

The closing of switch 58 as aforesaid completes the central power circuit, including the operating circuit for a voltage oscillator such as a square wave generator 62 which is located in control box 56. Generator 62 sends its alternating polarity current to solenoid 36, preferably via a cable comprising two conductors 66 and 67 as will be understood by those skilled in the art. The details of the square wave voltage are not set forth here because frequency, voltage, and current values will vary according to specific vehicle needs and will be determined by well known design methods.

The square wave signal results in periodic voltage changes in solenoid 36, causing piston 26 to reciprocate, thereby cycling the pressure $P_2$ in brake line 46. Thus, when the piston 26 moves upward, the pressure in line 46 and consequently in cylinders 44 drops, allowing the wheel to rotate; conversely, downward movement of the piston produces an increase in pressure and results in lock-up of the wheel if the road surface has not changed. Because wheel 22 should have some freedom to rotate, relay switch 58 should have a built-in reopening time delay.

Pulse pump 24 functions until brake pedal 10 is released an amount sufficient for pressure $P_1$ to fall below pressure $P_2$, allowing differential pressure switch 23' to open the circuit for solenoid 21. More specifically, the elements are illustrated functionally in FIG. 2, wherein sensor 23 embodies a bridging or movable contact 70 hinged at 72 and insulated from the sensor housing. When pressure $P_2$ exceeds pressure $P_1$, contact 70 swings counter-clockwise into engagement with contact 74 which is grounded through the sensor housing. Thus a circuit is completed for coil 76, which pulls armature 78 downward against spring 80, opening switch 23'. The central control circuit is also opened if wheel 22 starts to turn again so as to open switch 58, and by pedal 10 reaching its retracted position to open switch 17.

It will be seen from the foregoing that the pressure $P_2$ obtaining in the brake circuit between valve 20 and the wheel at the time valve 20 closes is just above the maximum brake line pressure allowable to keep wheel 22 rotating, and that pressure $P_2$ in the system disclosed herein will fluctuate so as to straddle or bracket that maximum pressure. If the road surface changes while valve 20 is closed, it is probable that the aforesaid maximum pressure will be different for the different surface. The change in road surface can then be communicated to the system by the simple expedient of the operator taking his foot off pedal 10, and then re-applying the brake. The system will then react in response to the changed road surface.

To understand the function of switch 23' in the electric power circuit shown in FIG. 2, consider the circumstances of braking action which activates pulse pump 24, and the vehicle moves from the road surface that set up the critical pressure $P_2$ about which the pulsing pressure varies — i.e., from just above the critical pressure to just below that pressure — onto a totally different surface. In many cases, said "totally different" surface will be sufficiently different so that the cycling pressure under pulse pump 24 will not straddle the critical pressure for the new surface, and the wheels remain locked up. As pointed out above, the operator can set up a new critical pressure in the isolated brake cylinder circuit by taking his foot off the pedal completely, so as to re-open brake switch 17.

Such a maneuver requires that the brake pedal be returned all the way to its "off" position. Under panic conditions, the operator might not allow the pedal to return far enough to open switch 17 before again hitting the brake pedal. However, he will probably have pulled his brake foot back far enough to reduce pressure $P_1$ to the point that $P_2$ is greater than $P_1$. When that happens, movable contact 70 engages contact 74, completing a circuit for coil 76, and opening switch 23'. Thereafter, a reapplication of brake pressure to the wheel brakes sets up a new critical pressure $P_2$ in case the wheels lock up, whereupon the cyclic variation of pressure in the isolated wheel cylinder circuit again brackets or straddles the pressure $P_2$ which caused the wheels to lock up on the "new" surface, and anti-skid braking is again in effect.

Whether or not the operator brings his foot back far enough to open switch 17, pressure $P_2$ will exceed pressure $P_1$ before switch 17 can be opened, thus assuring that the power circuit is opened and assuring that the new critical $P_2$ is established, whether switch 17 opens or not and for whatever reason.

In addition to the foregoing, it should be noted that a skilled operator will soon learn how much pressure he needs to take off the brake pedal to set up the $$P_2 > P_1$$

condition without even trying to open switch 17, and he will thus bring the vehicle back into controlled braking more quickly than if he had to rely on switch 17 alone.

DESCRIPTION OF FIG. 4 EMBODIMENT

Figure 4:
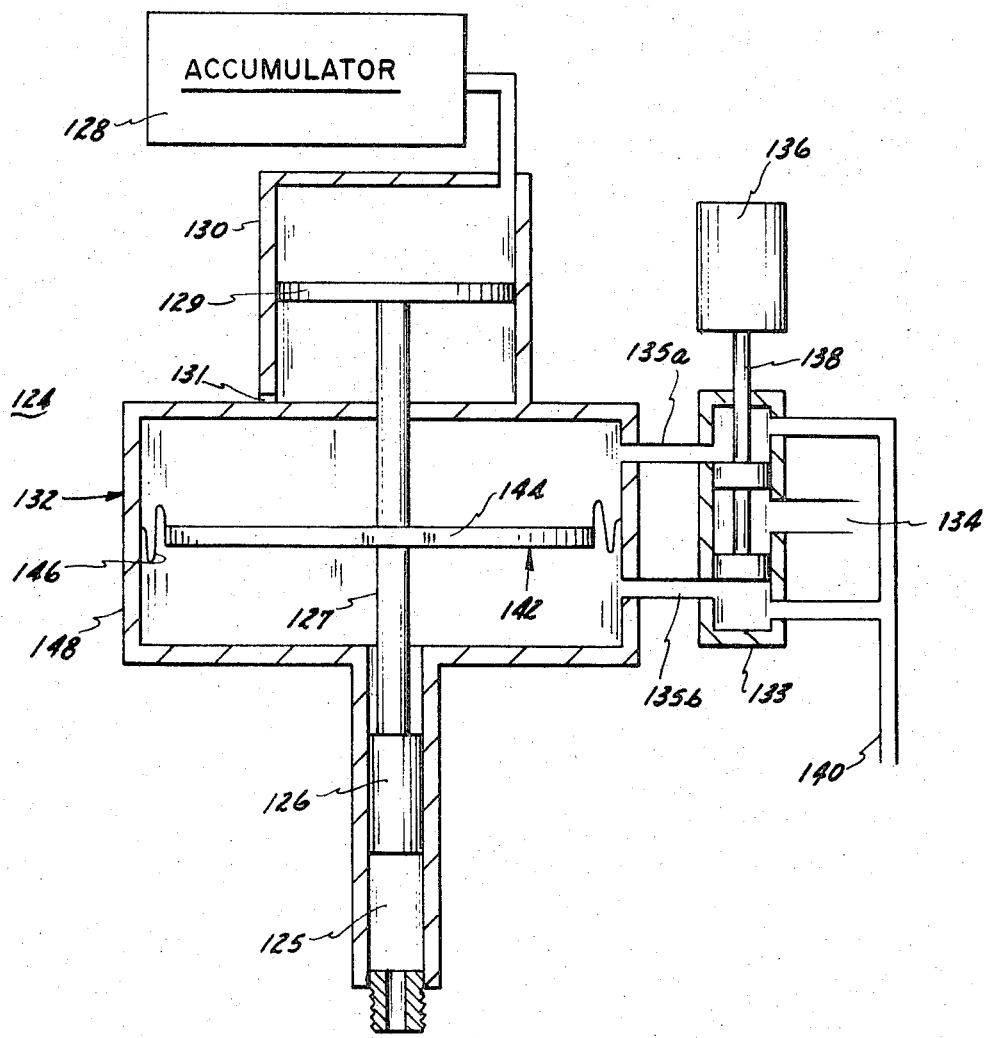
FIG. 4 is another embodiment of the component shown in FIG. 3.

Reference will now be had to the embodiment shown in FIG. 4, which shows a pulse pump having alternative resilient means as well as fluid motor actuation of the pump piston. More specifically, pulse pump 124 is provided with a chamber 125 in which is disposed a reciprocable piston 126 on a piston rod 127. Instead of a spring 28 as in the FIG. 3 pulse pump, the pulse pump 124 (FIG. 4) is provided with an accumulator 128 which may be any conventional device such as that disclosed in Mercier U.S. Pat. No. Re. 23,437 (Dec. 4, 1951), which originally issued to Mercier Sept. 23, 1941 as U.S. Pat. No. 2,256,835.

Accumulator 128 carries a pressure which is exposed to the upper surface of piston 129 in cylinder 130, piston 129 being secured on rod 127 along with pump piston 126. The space under piston 129 is vented to atmosphere via a vent 131.

In the FIG. 3 pulse pump, piston 26 serves also as an armature for an electric motor which is solenoid 36. An alternative actuator is shown in the pulse pump 124 of FIG. 4, wherein a fluid motor 132 is supplied with fluid by means of a valve 133 having a fluid energy supply connection 134 and delivery connections 135a and 135b communicating with upper and lower chambers respectively of fluid motor 132. A solenoid 136, similar to the solenoid 36 of the FIG. 3 embodiment, is connected in the FIG. 4 embodiment to the rod 138 which moves the valve spool of valve 133.

More specifically, the fluid energy supplied to connection 134 may be any one of number of conventional types, such as a vacuum, or air pressure, or hydraulic fluid under pressure. Valve 133 may be a conventional centered valve in which the delivery connections 135a and 135b are vented to atmospheric pressure by a connection 140 when solenoid 136 is deenergized. Such valve and energy systems are conventional and need not be detailed here.

Fluid motor 132 may be any of a number of conventional types and it will suffice for the purposes of this invention to indicate that the pressure responsive element 142 may be a piston, or a diaphragm, or a combination of both as here shown, comprising a piston-like disc 144 having a diaphragm type of seal 146 with the inner surface of the operating cylinder 148 of fluid motor 132.

OPERATION OF FIG. 4 EMBODIMENT

With the vehicle in motion without braking, switches 17 and 58 are open because the brake pedal is fully retracted and the wheels are turning. Switch 23' is closed because $P_1 = P_2$. When the operator applies the brakes, pedal 10 moves away from engagement with switch 17, so that switch 17 closes, but switch 58 remains open because the wheels are rotating.

If the coefficient of friction is low enough, wheel 22 locks up, whereupon sensor 54 no longer sends a signal to switch 58, so that switch 58 closes. The central power circuit shown in FIG. 2 is now complete and solenoid 21 is energized. Solenoid 21 closes valve 20 to isolate that portion of the hydraulic brake circuit between valve 20 and wheel 22.

Meanwhile, chamber 125 and thus also piston 126 are exposed to the lock-up pressure which obtains at $P_2$ when valve 20 closes. Piston 126 moves upward until the upward force due to pressure $P_2$ operating on the lower surface of piston 126 is balanced by the downward force due to accumulator 128 acting on the upper surface of piston 129. The chamber below piston 129 and both ends of fluid motor 132 are at atmospheric pressure due to vent 131 (for piston 129) and due to the centered position of valve 133 which opens both sides of fluid motor 132 to connection 140.

When the central power circuit of FIG. 2 closes, square wave generator 62 is activated, and it applies a voltage of alternating polarity to solenoid 136. The resulting reciprocation of rod 138 applies alternating pressure differentials to the opposite ends of fluid motor 132, which reciprocates piston 126 up and down. Such movement of piston 126 serves to vary the pressure $P_2$ between a high just above lock-up pressure and a low just below lock-up pressure to provide the desired non-skid braking.

In other respects, operation of the two systems is similar and will be understood from what is set forth above in the discussion of the operation of the embodiment disclosed in FIGS. 1 – 3.

I wish it to be understood that I do not desire to be limited to the exact details of construction shown and described, for obvious modifications will occur to persons skilled in the art.

I claim:

1. In an anti-skid vehicular braking system having an operator-operable fluid pressure pump to actuate a brake for a vehicle wheel:
   a fluid conduit connecting the pump with the brake;
   normally open valve means in the conduit;
   electrical valve operating means energizeable to close the valve;
   an electric power circuit for the valve operating means;
   first switch means in the electric power circuit and having a normally closed position;
   a switch operating means to hold the switch open in response to rotation of said wheel;
   a source of fluid at a fluctuating pressure for supplying fluid to said conduit at a pressure which varies from just above the pressure in the conduit at lock-up to a pressure just below the lock-up pressure, said source connected and communicating directly with said conduit and responsive to fluid pressure in said conduit at all times that the valve means is held open by its operating means;

said fluid source having electrical actuating means independent of said valve operating means connected to receive power from said power circuit; and other switch means to interrupt said power circuit in response to cessation of operation of said pump.

2. A braking system as in claim 1, said fluid source including electric power generating means of a type which generate an alternating voltage.

3. A braking system as in claim 2, said fluid source including a solenoid operated pump.

4. A braking system as in claim 3, the solenoid-operated pump having a piston exposed and responsive to pressure in said conduit, and resilient means biasing the piston against conduit pressure.

5. A braking system as in claim 4, in which said other switch means includes a normally closed switch and an operator-operable actuator in engagement with the first-named pump, the switch of said other switch means being responsive to the fully retracted position of the operator-operable actuator to open its normally closed contacts.

6. A braking system as in claim 5, said other switch means including a second normally-closed switch, and pressure sensitive means connected with the fluid conduit on opposite sides of the normally open valve means for opening the second normally closed switch when conduit pressure on the brake side of said valve exceeds conduit pressure on the first-named pump side of said valve.

7. A braking system as in claim 1, said fluid source including a solenoid-operated pump.

8. A braking system as in claim 7, the solenoid-operated pump having a piston exposed and responsive to pressure in said conduit, and resilient means biasing the piston against conduit pressure.

9. A braking system as in claim 8, in which said other switch means includes a normally closed switch and an operator-operable actuator in engagement with the first-named pump, the switch of said other switch means being responsive to the fully retracted position of the operator-operable actuator to open its normally-closed contacts.

10. A braking system as in claim 9, said other switch means including a second normally closed switch, and pressure sensitive means connected with the fluid conduit on opposite sides of the normally open valve means for opening the second normally closed switch when conduit pressure on the brake side of said valve exceeds conduit pressure on the first-named pump side of said valve.

11. A braking system as in claim 1, in which said other switch means includes a normally closed switch and an operator-operable actuator in engagement with the first-named pump, the switch of said other switch means being responsive to the fully retracted position of the operator-operable actuator to open its normally closed contacts.

12. A braking system as in claim 11, said other switch means including a second normally closed switch, and pressure sensitive means connected with the fluid conduit on opposite sides of the normally open valve means for opening the second normally closed switch when conduit pressure on the brake side of said valve exceeds conduit pressure on the first-named pump side of said valve.

13. A braking system as in claim 1, said other switch means including a normally closed switch, and pressure sensitive means connected with the fluid conduit on opposite sides of the normally open valve means for opening the normally closed switch when conduit pressure on the brake side of said valve exceeds conduit pressure on the opposite side of said valve.

14. A braking system as in claim 13, said fluid source including electric power generating means of a type which generate an alternating voltage.

* * * * *